United States Patent
Lee et al.

(10) Patent No.: US 11,066,581 B2
(45) Date of Patent: *Jul. 20, 2021

(54) PRESSURE-SENSITIVE ADHESIVE COMPOSITION FOR FOLDABLE DISPLAY

(71) Applicant: INNOX Advanced Materials Co., Ltd., Chungcheongnam-do (KR)

(72) Inventors: Jong Geol Lee, Chungcheongnam-do (KR); Dong Ki Baek, Gyeonggi-do (KR); Sung Nam Lee, Chungcheongnam-do (KR); Hanhi Kang, Daejeon (KR)

(73) Assignee: INNOX ADVANCED MATERIALS CO., LTD., Chungcheongnam-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/784,064

(22) Filed: Feb. 6, 2020

(65) Prior Publication Data

US 2020/0255705 A1  Aug. 13, 2020

(30) Foreign Application Priority Data

Feb. 7, 2019  (KR) .................. 10-2019-0014542

(51) Int. Cl.
*C09J 133/08*  (2006.01)

(52) U.S. Cl.
CPC .................. *C09J 133/08* (2013.01)

(58) Field of Classification Search
CPC ...... C09J 133/08; C09J 2301/30; C09J 11/06; C09J 133/00; C09J 9/00; C09J 2301/312
See application file for complete search history.

(56) References Cited

U.S. PATENT DOCUMENTS

| 2008/0200718 | A1* | 8/2008 | Hayes | C08G 18/3281 560/26 |
| 2010/0182679 | A1 | 7/2010 | Han et al. | |
| 2011/0057331 | A1* | 3/2011 | Hayashi | C09J 7/22 257/783 |
| 2011/0256666 | A1* | 10/2011 | Sugo | H01L 21/6836 438/113 |
| 2012/0061805 | A1* | 3/2012 | Amano | C09J 9/02 257/622 |
| 2017/0253769 | A1 | 9/2017 | Cho et al. | |

FOREIGN PATENT DOCUMENTS

| CN | 101600771 A | | 12/2009 | |
| CN | 107163865 A | | 9/2017 | |
| EP | 0990688 A1 | * | 4/2000 | ............ C09J 123/08 |
| JP | 2018045213 A | | 3/2018 | |
| KR | 10-2015-0011230 | | 1/2015 | |
| KR | 2016-0083583 | * | 7/2016 | |
| WO | 2018/211586 A1 | | 11/2018 | |

OTHER PUBLICATIONS

Translation of KR 2016-0083583 (Year: 2016).*
Japanese Office Action dated Jan. 26, 2021 in connection with the Japanese Patent Application No. 2020-020100.
Chinese Office Action for corresponding Chinese application No. 202010080765.6 dated May 8, 2021 citing the above references.

* cited by examiner

*Primary Examiner* — Robert C Boyle
(74) *Attorney, Agent, or Firm* — Hauptman Ham, LLP

(57) ABSTRACT

Provided is a pressure-sensitive adhesive composition for a foldable display, more particularly, a pressure-sensitive adhesive composition for a foldable display which, by satisfying a specific range of storage modulus for each frequency at a temperature of 50° C. or more as well as at low temperature and room temperature, not only allows excellent folding properties to be realized but also satisfies excellent adhesion, excellent heat resistance, and excellent recovery rate requirements at the same time.

13 Claims, No Drawings

PRESSURE-SENSITIVE ADHESIVE COMPOSITION FOR FOLDABLE DISPLAY

CROSS-REFERENCE TO RELATED APPLICATION

This application claims priority to and the benefit of Korean Patent Application No. 10-2019-0014542, filed on Feb. 7, 2019, the disclosure of which is incorporated herein by reference in its entirety.

BACKGROUND

1. Field of the Invention

The present invention relates to a pressure-sensitive adhesive composition for a foldable display, and more particularly, to a pressure-sensitive adhesive composition for a foldable display which, by satisfying a specific range of storage modulus for each frequency at a temperature of 50° C. or more as well as at low temperature and room temperature, not only allows excellent folding properties to be realized but also satisfies excellent adhesion, excellent heat resistance, and excellent recovery rate requirements at the same time.

2. Discussion of Related Art

Pressure-sensitive adhesives are materials that can permanently remain sticky as long as the surface thereof is not contaminated, and when used, the pressure-sensitive adhesives allow adherends to easily adhere in a short time at room temperature even with very small pressure such as pressure applied with a finger.

Such pressure-sensitive adhesives have been used in a wide variety of fields such as household goods, automobiles, aviation, and the like and in the information technology (IT) industry, and in the IT industry, the pressure-sensitive adhesives have been used for semiconductors, mobile phones, displays, precision products, and the like, for the purpose of providing transportation, fixation of materials, and protection.

Recently, with the development of display-related technology, display devices that can be deformed (folded, rolled, stretched like a rubber band, etc.) at the stage of use have been researched and developed. Since such displays can be deformed into various shapes, both the requirement that the displays should be large at the stage of use and the requirement that the displays should be small for portability can be satisfied. Such deformable display devices can not only be deformed into a predetermined shape but also can be deformed into various shapes to meet the needs of the user or of the situation in which the display devices are used. Therefore, it is necessary that the deformed shapes of the displays are recognized and the display devices are controlled in a manner suitable for the recognized shapes.

Meanwhile, since the deformable display devices carry a risk that individual components of the display devices may be damaged due to the deformation, the individual components of such display devices are required to satisfy folding reliability and folding stability.

Accordingly, the adhesives used in the deformable display devices should satisfy the above-described folding reliability and folding stability. However, although the adhesives being currently used in commercialized deformable display devices may satisfy the folding property requirements, the adhesives do not satisfy all the property requirements such as adhesion, heat resistance, and recovery rate requirements, and the like.

Related-Art Documents

[Patent Documents]
(Patent Document 0001) Korean Laid-Open Patent Application No. 2015-0011230 (published on Jan. 30, 2015)

SUMMARY OF THE INVENTION

The present invention has been devised to address the above-described problems, and is directed to providing a pressure-sensitive adhesive composition for a foldable display which, by satisfying a specific range of storage modulus for each frequency at a temperature of 50° C. or more as well as at low temperature and room temperature, not only allows excellent folding properties to be realized but also satisfies excellent adhesion, excellent heat resistance, and excellent recovery rate requirements at the same time.

In order to solve the above-described problems, the pressure-sensitive adhesive composition for a foldable display according to the present invention may include an acrylic polymer and a crosslinking agent.

According to one exemplary embodiment of the present invention, the pressure-sensitive adhesive composition for a foldable display according to the present invention may satisfy the following Relational Formulas 1 and 2.

$$0 \leq X \leq 100 \quad \text{[Relational Formula 1]}$$

$$Y_1 = \alpha_1 \times X - \beta_1 \quad \text{[Relational Formula 2]}$$

In Relational Formulas 1 and 2, X represents sweep frequency (Hz), $Y_1$ represents the storage modulus (Pa) of the pressure-sensitive adhesive composition after curing as measured at a temperature of −20° C. and a strain of 1%, $\alpha_1$ is $15 \times 10^4$ to $45 \times 10^4$, and $\beta_1$ is $40 \times 10^4$ to $90 \times 10^4$.

According to one exemplary embodiment of the present invention, the pressure-sensitive adhesive composition for a foldable display according to the present invention may further satisfy the following Relational Formula 3.

$$Y_2 = \alpha_2 \times X - \beta_2 \quad \text{[Relational Formula 3]}$$

In Relational Formula 3, X represents sweep frequency (Hz), $Y_2$ represents the storage modulus (Pa) of the pressure-sensitive adhesive composition after curing as measured at a temperature of 25° C. and a strain of 1%, $\alpha_2$ is 1,600 to 2,400, and $\beta_2$ is $6 \times 10^4$ to $10 \times 10^4$.

According to one exemplary embodiment of the present invention, the pressure-sensitive adhesive composition for a foldable display according to the present invention may further satisfy the following Relational Formula 4.

$$Y_3 = \alpha_3 \times X - \beta_3 \quad \text{[Relational Formula 4]}$$

In Relational Formula 4, X represents sweep frequency (Hz), $Y_3$ represents the storage modulus (Pa) of the pressure-sensitive adhesive composition after curing as measured at a temperature of 60° C. and a strain of 1%, $\alpha_3$ is 630 to 1,200, and $\beta_3$ is $3.5 \times 10^4$ to $7.5 \times 10^4$.

According to one exemplary embodiment of the present invention, the pressure-sensitive adhesive composition for a foldable display according to the present invention may further satisfy the following conditions (1) to (4).

$$30 \times 10^4 \text{ Pa} \leq A \leq 100 \times 10^4 \text{ Pa} \quad (1)$$

$$50 \times 10^4 \text{ Pa} \leq B \leq 130 \times 10^4 \text{ Pa} \quad (2)$$

$$250 \times 10^4 \text{ Pa} \leq C \leq 450 \times 10^4 \text{ Pa} \quad (3)$$

$$2,000 \times 10^4 \text{ Pa} \leq D \leq 4,000 \times 10^4 \text{ Pa} \quad (4)$$

In the condition (1), A is the storage modulus of the pressure-sensitive adhesive composition after curing as measured at a temperature of −20° C., a frequency of 0.5 Hz, and a strain of 1%.

In the condition (2), B is the storage modulus of the pressure-sensitive adhesive composition after curing as measured at a temperature of −20° C., a frequency of 1.0 Hz, and a strain of 1%.

In the condition (3), C is the storage modulus of the pressure-sensitive adhesive composition after curing as measured at a temperature of −20° C., a frequency of 10 Hz, and a strain of 1%.

In the condition (4), D is the storage modulus of the pressure-sensitive adhesive composition after curing as measured at a temperature of −20° C., a frequency of 100 Hz, and a strain of 1%.

According to one exemplary embodiment of the present invention, the pressure-sensitive adhesive composition for a foldable display according to the present invention may further satisfy the following conditions (5) to (8).

$$5 \times 10^4 \text{ Pa} \leq E \leq 8 \times 10^4 \text{ Pa} \quad (5)$$

$$5.5 \times 10^4 \text{ Pa} \leq F \leq 9.5 \times 10^4 \text{ Pa} \quad (6)$$

$$10 \times 10^4 \text{ Pa} \leq G \leq 16 \times 10^4 \text{ Pa} \quad (7)$$

$$22 \times 10^4 \text{ Pa} \leq H \leq 35 \times 10^4 \text{ Pa} \quad (8)$$

In the condition (5), E is the storage modulus of the pressure-sensitive adhesive composition after curing as measured at a temperature of 25° C., a frequency of 0.5 Hz, and a strain of 1%.

In the condition (6), F is the storage modulus of the pressure-sensitive adhesive composition after curing as measured at a temperature of 25° C., a frequency of 1.0 Hz, and a strain of 1%.

In the condition (7), G is the storage modulus of the pressure-sensitive adhesive composition after curing as measured at a temperature of 25° C., a frequency of 10 Hz, and a strain of 1%.

In the condition (8), H is the storage modulus of the pressure-sensitive adhesive composition after curing as measured at a temperature of 25° C., a frequency of 100 Hz, and a strain of 1%.

According to one exemplary embodiment of the present invention, the pressure-sensitive adhesive composition for a foldable display according to the present invention may further satisfy the following conditions (9) to (12).

$$2.8 \times 10^4 \text{ Pa} \leq I \leq 5.5 \times 10^4 \text{ Pa} \quad (9)$$

$$3.2 \times 10^4 \text{ Pa} \leq J \leq 6.5 \times 10^4 \text{ Pa} \quad (10)$$

$$5.5 \times 10^4 \text{ Pa} \leq K \leq 10.5 \times 10^4 \text{ Pa} \quad (11)$$

$$10 \times 10^4 \text{ Pa} \leq L \leq 20 \times 10^4 \text{ Pa} \quad (12)$$

In the condition (9), I is the storage modulus of the pressure-sensitive adhesive composition after curing as measured at a temperature of 60° C., a frequency of 0.5 Hz, and a strain of 1%.

In the condition (10), J is the storage modulus of the pressure-sensitive adhesive composition after curing as measured at a temperature of 60° C., a frequency of 1.0 Hz, and a strain of 1%.

In the condition (11), K is the storage modulus of the pressure-sensitive adhesive composition after curing as measured at a temperature of 60° C., a frequency of 10 Hz, and a strain of 1%.

In the condition (12), L is the storage modulus of the pressure-sensitive adhesive composition after curing as measured at a temperature of 60° C., a frequency of 100 Hz, and a strain of 1%.

According to one exemplary embodiment of the present invention, the acrylic polymer may include a compound represented by the following Chemical Formula 1.

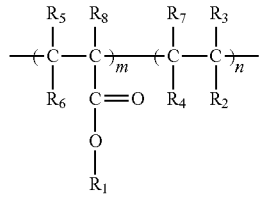

[Chemical Formula 1]

In Chemical Formula 1, $R_1$ is a C1-C20 alkyl group, $R_2$ is a carboxyl group, a carboxymethyl ester group, a 2-carboxyethyl ester group, a 3-carboxypropyl ester group, a 4-carboxybutyl ester group, a 5-carboxypentyl ester group, or a 6-carboxyhexyl ester group, $R_3$, $R_4$, $R_5$, $R_6$, $R_7$, and $R_8$ are each independently —H or a C1-C10 alkyl group, m is a rational number satisfying a range of 87 to 95, and n is a rational number satisfying a range of 5 to 13.

According to one exemplary embodiment of the present invention, the crosslinking agent may include one or more selected from among ethylene glycol diglycidyl ether, triglycidyl ether, trimethylolpropane triglycidyl ether, N,N,N,N'-tetraglycidyl-m-xylenediamine, and glycerin diglycidyl ether.

According to one exemplary embodiment of the present invention, the crosslinking agent may be included in an amount of 0.1 to 10 parts by weight relative to 100 parts by weight of the acrylic polymer.

According to one exemplary embodiment of the present invention, the pressure-sensitive adhesive composition for a foldable display according to the present invention may further satisfy the following conditions (13) to (15).

$$75\% \leq M \quad (13)$$

$$85\% \leq N \quad (14)$$

$$90\% \leq O \quad (15)$$

In the condition (13), M is a recovery rate at 600 seconds (s) after deformation of the cured pressure-sensitive adhesive composition as determined by Relational Formula 5 at a temperature of −20° C.

In the condition (14), N is a recovery rate at 600 s after deformation of the cured pressure-sensitive adhesive composition as determined by Relational Formula 5 at a temperature of 25° C.

In the condition (15), O is a recovery rate at 600 s after deformation of the cured pressure-sensitive adhesive composition as determined by Relational Formula 5 at a temperature of 60° C.

Recovery rate at 600 s after deformation (%)=(Strain after 600 s of deformation−Residual strain at 600 s after deformation)/Strain after 600 s of deformation×100    [Relational Formula 5]

According to one exemplary embodiment of the present invention, the pressure-sensitive adhesive composition for a foldable display according to the present invention may have a glass transition temperature (Tg) of −32 to −27° C.

According to one exemplary embodiment of the present invention, the pressure-sensitive adhesive composition for a foldable display according to the present invention may have an acid value of 8 to 19 mgKOH/g.

According to one exemplary embodiment of the present invention, the pressure-sensitive adhesive composition for a foldable display according to the present invention may exhibit an adhesion of 700 to 1200 gf/inch when peeled at a rate of 300 mm/min and 180° after being attached to a non-alkali glass plate.

DETAILED DESCRIPTION OF EXEMPLARY EMBODIMENTS

Hereinafter, exemplary embodiments of the present invention will be described in detail with reference to the accompanying drawings so that those of ordinary skill in the art can easily carry out the present invention. The present invention may be embodied in many different forms and is not limited to the embodiments described herein. In order to clearly illustrate the present invention, portions or components not related to the description of the present invention are omitted in the drawings, and the same reference numerals are assigned to the same or similar components throughout the specification.

The low temperature in the present invention may be a temperature of −10° C. or less, preferably −30 to −10° C., more preferably −25 to −15° C. In addition, the room temperature in the present invention may be a temperature of 10 to 40° C., preferably 15 to 35° C., more preferably 20 to 30° C.

The pressure-sensitive adhesive composition for a foldable display according to the present invention forms a pressure-sensitive adhesive layer, for example, by curing, and the pressure-sensitive adhesive layer may be included in a foldable display and used for adhering the display panel and the cover glass and the like.

The "foldable display" defined herein may refer to a flexible display that has been designed to be repeatedly folded and unfolded like paper and has a radius of curvature of 5 mm or less at the points where the display is folded.

In addition, in order to be applicable to a foldable display, the pressure-sensitive adhesive composition for a foldable display according to the present invention should exhibit folding properties unlike existing pressure-sensitive adhesives having other applications, and in order to realize such excellent folding properties, it is preferred that the pressure-sensitive adhesive composition satisfies a specific range of storage modulus for each frequency at a temperature of 50° C. or more as well as at low temperature and room temperature. In addition, the specific range of storage modulus for each frequency is the range which, when satisfied at each temperature of the present invention, not only allows the excellent folding properties to be realized but also allows the excellent adhesion, excellent heat resistance, and excellent recovery rate requirements to be satisfied at the same time.

Other specific configurations of the foldable display are disclosed, for example, in Korean Laid-Open Patent Application No. 2015-0138450 and the like, and the pressure-sensitive adhesive composition for a foldable display according to the present invention may be included in such a known configuration of the foldable display without limitation.

The pressure-sensitive adhesive composition for a foldable display according to the present invention may include an acrylic polymer and a crosslinking agent.

The acrylic polymer of the present invention may have a crosslinkable functional group.

The crosslinkable functional group may be selected without limitation as long as it can cause a crosslinking reaction with the crosslinking agent, and preferably includes one or more selected from the group consisting of a hydroxy group, an isocyanate group, a glycidyl group, an epoxy group, an amine group, and a carboxyl group.

In addition, preferably, the acrylic polymer of the present invention includes a compound represented by the following Chemical Formula 1.

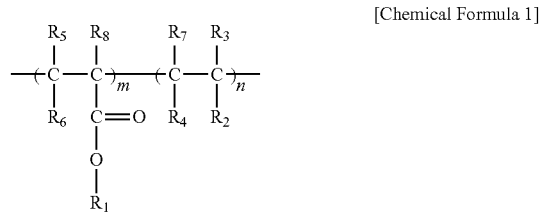

[Chemical Formula 1]

In Chemical Formula 1, $R_1$ is a C1-C20 alkyl group, preferably a C2-C16 alkyl group, more preferably a C3-C12 alkyl group.

In addition, in Chemical Formula 1, $R_2$ is a carboxyl group, a carboxymethyl ester group, a 2-carboxyethyl ester group, a 3-carboxypropyl ester group, a 4-carboxybutyl ester group, a 5-carboxypentyl ester group, or a 6-carboxyhexyl ester group, preferably a carboxymethyl ester group, a 2-carboxyethyl ester group, a 3-carboxypropyl ester group, a 4-carboxybutyl ester group, a 5-carboxypentyl ester group, or a 6-carboxyhexyl ester group, more preferably a 2-carboxyethyl ester group, a 3-carboxypropyl ester group, a 4-carboxybutyl ester group, a 5-carboxypentyl ester group, or a 6-carboxyhexyl ester group.

In addition, in Chemical Formula 1, $R_3$, $R_4$, $R_5$, $R_6$, $R_7$, and $R_8$ are each independently —H or a C1-C10 alkyl group, preferably, $R_3$ is —H or a C1-C3 alkyl group and $R_4$, $R_5$, $R_6$, $R_7$, and $R_8$ are each independently —H or a C1-C10 alkyl group, more preferably, $R_3$ is —H or a methyl group and $R_4$, $R_5$, $R_6$, $R_7$, and $R_8$ are each independently —H or a C1-C5 alkyl group.

In addition, in Chemical Formula 1, m is a rational number satisfying a range of 87 to 95, preferably 88 to 94.

In addition, in Chemical Formula 1, n is a rational number satisfying a range of 5 to 13, preferably 6 to 12.

Meanwhile, the acrylic polymer of the present invention may be prepared in a variety of ways. For example, the acrylic polymer of the present invention may be prepared by selecting the monomers necessary for preparing the acrylic polymer and applying a monomer mixture in which the selected monomers are mixed in a desired ratio to a technique such as solution polymerization, bulk polymerization, suspension polymerization, emulsion polymerization, or the like, and may be suitably prepared by solution polymerization. The manner of preparing the polymer through solution polymerization is not particularly limited.

The solution polymerization may be carried out in a state in which the monomer components selected for preparing the acrylic polymer of the present invention are mixed at an appropriate weight ratio, and may be carried out for 3 to 15 hours at a polymerization temperature of 30 to 140° C. by mixing a radical polymerization initiator and a solvent.

The radical polymerization initiator used for preparing the acrylic polymer of the present invention may be a known material, and, for example, an azo-based polymerization initiator such as azobisisobutyronitrile, azobis(cyclohexanecarbonitrile), or the like or an oxide-based polymerization initiator such as benzoyl peroxide, acetyl peroxide, or the like may be used.

In addition, one type or a mixture of two or more types of the radical polymerization initiators may be used, and the usage amount thereof may be 0.01 to 1 part by weight relative to 100 parts by weight of the acrylic polymer.

In addition, the solvent used for preparing the acrylic polymer of the present invention may be a known material. Although, for example, ethyl acetate, toluene, or the like may be used, the present invention is not limited thereto.

In addition, the crosslinking agent of the present invention may include a multifunctional compound having at least two functional groups in a single molecule, which are capable of reacting with the crosslinkable functional group of the acrylic polymer of the present invention, specifically, a multifunctional compound having two to six such functional groups in a single molecule. In this case, the at least two functional groups included in the single molecule may be the same type or different types.

Specifically, the crosslinking agent of the present invention may have one or more functional groups selected from the group consisting of an alkoxy silane group, a carboxyl group, an acid anhydride group, a vinyl ether group, an amine group, a carbonyl group, an isocyanate group, an epoxy group, an aziridinyl group, a carbodiimide group, and an oxazoline group. The crosslinking agent of the present invention preferably includes one or more selected from among ethylene glycol diglycidyl ether, triglycidyl ether, trimethylolpropane triglycidyl ether, N,N,N,N'-tetraglycidyl-m-xylenediamine, and glycerin diglycidyl ether, and more preferably includes N,N,N,N'-tetraglycidyl-m-xylenediamine.

Meanwhile, the pressure-sensitive adhesive composition for a foldable display according to the present invention may include the crosslinking agent in an amount of 0.1 to 10 parts by weight, preferably 0.5 to 5 parts by weight, relative to 100 parts by weight of the acrylic polymer. When the crosslinking agent does not satisfy the above-described weight range, a problem that the pressure-sensitive adhesive composition for a foldable display according to the present invention does not satisfy the storage modulus range to be described below may occur.

In addition, the pressure-sensitive adhesive composition for a foldable display according to the present invention may satisfy Relational Formulas 1 and 2.

$$0 \leq X \leq 100 \quad \text{[Relational Formula 1]}$$

In Relational Formula 1, X represents sweep frequency (Hz).

$$Y_1 = \alpha_1 \times X - \beta_1 \quad \text{[Relational Formula 1]}$$

In Relational Formula 2, X represents sweep frequency (Hz), $Y_1$ represents the storage modulus (Pa) of the pressure-sensitive adhesive composition after curing as measured at a temperature of −20° C. and a strain of 1%, at is $15 \times 10^4$ to $45 \times 10^4$, preferably $20 \times 10^4$ to $33 \times 10^4$, and $\beta_1$ is $40 \times 10^4$ to $90 \times 10^4$, preferably $50 \times 10^4$ to $80 \times 10^4$.

When the pressure-sensitive adhesive composition for a foldable display according to the present invention does not satisfy the above-described Relational Formulas 1 and 2, it may be difficult to satisfy folding property, adhesion, heat resistance, and recovery rate requirements at the same time.

In addition, the pressure-sensitive adhesive composition for a foldable display according to the present invention may further satisfy conditions (1) to (4).

$$30 \times 10^4 \text{ Pa} \leq A \leq 100 \times 10^4 \text{ Pa, preferably } 50 \times 10^4 \text{ Pa} \leq A \leq 80 \times 10^4 \text{ Pa} \quad (1)$$

In the condition (1), A is the storage modulus of the pressure-sensitive adhesive composition after curing as measured at a temperature of −20° C., a frequency of 0.5 Hz, and a strain of 1%.

In regard to the condition (1), when A is less than $30 \times 10^4$ Pa, issues related to a recovery rate and residual strain may occur, and when A is greater than $100 \times 10^4$ Pa, cracking or lifting may occur in the pressure-sensitive adhesive composition after curing.

$$50 \times 10^4 \text{ Pa} \leq B \leq 130 \times 10^4 \text{ Pa, preferably } 70 \times 10^4 \text{ Pa} \leq B \leq 110 \times 10^4 \text{ Pa} \quad (2)$$

In the condition (2), B is the storage modulus of the pressure-sensitive adhesive composition after curing as measured at a temperature of −20° C., a frequency of 1.0 Hz, and a strain of 1%.

In regard to the condition (2), when B is less than $50 \times 10^4$ Pa, issues related to a recovery rate and residual strain may occur, and when B is greater than $130 \times 10^4$ Pa, cracking or lifting may occur in the pressure-sensitive adhesive composition after curing.

$$250 \times 10^4 \text{ Pa} \leq C \leq 450 \times 10^4 \text{ Pa, preferably } 280 \times 10^4 \text{ Pa} \leq C \leq 410 \times 10^4 \text{ Pa} \quad (3)$$

In the condition (3), C is the storage modulus of the pressure-sensitive adhesive composition after curing as measured at a temperature of −20° C., a frequency of 10 Hz, and a strain of 1%.

In regard to the condition (3), when C is less than $250 \times 10^4$ Pa, issues related to a recovery rate and residual strain may occur, and when C is greater than $450 \times 10^4$ Pa, cracking or lifting may occur in the pressure-sensitive adhesive composition after curing.

$$2{,}000 \times 10^4 \text{ Pa} \leq D \leq 4{,}000 \times 10^4 \text{ Pa, preferably } 2{,}100 \times 10^4 \text{ Pa} \leq D \leq 3{,}500 \times 10^4 \text{ Pa} \quad (4)$$

In the condition (4), D is the storage modulus of the pressure-sensitive adhesive composition after curing as measured at a temperature of −20° C., a frequency of 100 Hz, and a strain of 1%.

In regard to the condition (4), when D is less than $2{,}000 \times 10^4$ Pa, issues related to a recovery rate and residual strain may occur, and when D is greater than $4{,}000 \times 10^4$ Pa, cracking or lifting may occur in the pressure-sensitive adhesive composition after curing.

Meanwhile, the pressure-sensitive adhesive composition for a foldable display according to the present invention may satisfy the following Relational Formula 3 in addition to the above-described Relational Formula 1.

$$Y_2 = \alpha_2 \times X - \beta_2 \quad \text{[Relational Formula 3]}$$

In Relational Formula 3, X represents sweep frequency (Hz), $Y_2$ represents the storage modulus (Pa) of the pressure-sensitive adhesive composition after curing as measured at a temperature of 25° C. and a strain of 1%, $\alpha_2$ is 1,600 to 2,400, preferably 1,700 to 2,300, and $\beta_2$ is $6 \times 10^4$ to $10 \times 10^4$, preferably $6.5 \times 10^4$ to $9.5 \times 10^4$.

When the pressure-sensitive adhesive composition for a foldable display according to the present invention does not satisfy the above-described Relational Formulas 1 and 3, it may be difficult to satisfy folding property, adhesion, heat resistance, and recovery rate requirements at the same time.

In addition, the pressure-sensitive adhesive composition for a foldable display according to the present invention may further satisfy conditions (5) to (8).

$$5\times10^4 \text{ Pa} \leq E \leq 8\times10^4 \text{ Pa, preferably } 5.5\times10^4 \text{ Pa} \leq E \leq 7.7\times10^4 \text{ Pa} \quad (5)$$

In the condition (5), E is the storage modulus of the pressure-sensitive adhesive composition after curing as measured at a temperature of 25° C., a frequency of 0.5 Hz, and a strain of 1%.

In regard to the condition (5), when E is less than $5\times10^4$ Pa, there may be a problem that a part of the cured pressure-sensitive adhesive composition is left as a residue when the composition is punched out, and when E is greater than $8\times10^4$ Pa, cracking or lifting may occur in the pressure-sensitive adhesive composition after curing.

$$5.5\times10^4 \text{ Pa} \leq F \leq 9.5\times10^4 \text{ Pa, preferably } 6.0\times10^4 \text{ Pa} \leq F \leq 9.0\times10^4 \text{ Pa} \quad (6)$$

In the condition (6), F is the storage modulus of the pressure-sensitive adhesive composition after curing as measured at a temperature of 25° C., a frequency of 1.0 Hz, and a strain of 1%.

In regard to the condition (6), when F is less than $5.5\times10^4$ Pa, there may be a problem that a part of the cured pressure-sensitive adhesive composition is left as a residue when the composition is punched out, and when F is greater than $9.5\times10^4$ Pa, cracking or lifting may occur in the pressure-sensitive adhesive composition after curing.

$$10\times10^4 \text{ Pa} \leq G \leq 16\times10^4 \text{ Pa, preferably } 10.5\times10^4 \text{ Pa} \leq G \leq 15\times10^4 \text{ Pa} \quad (7)$$

In the condition (7), G is the storage modulus of the pressure-sensitive adhesive composition after curing as measured at a temperature of 25° C., a frequency of 10 Hz, and a strain of 1%.

In regard to the condition (7), when G is less than $10\times10^4$ Pa, there may be a problem that a part of the cured pressure-sensitive adhesive composition is left as a residue when the composition is punched out, and when G is greater than $16\times10^4$ Pa, cracking or lifting may occur in the pressure-sensitive adhesive composition after curing.

$$22\times10^4 \text{ Pa} \leq H \leq 35\times10^4 \text{ Pa, preferably } 23\times10^4 \text{ Pa} \leq G \leq 33\times10^4 \text{ Pa} \quad (8)$$

In the condition (8), H is the storage modulus of the pressure-sensitive adhesive composition after curing as measured at a temperature of 25° C., a frequency of 100 Hz, and a strain of 1%.

In regard to the condition (8), when H is less than $22\times10^4$ Pa, there may be a problem that a part of the cured pressure-sensitive adhesive composition is left as a residue when the composition is punched out, and when H is greater than $35\times10^4$ Pa, cracking or lifting may occur in the pressure-sensitive adhesive composition after curing.

In addition, the pressure-sensitive adhesive composition for a foldable display according to the present invention may satisfy the following Relational Formula 4 in addition to the above-described Relational Formula 1.

$$Y_3 = \alpha_3 \times X - \beta_3 \quad \text{[Relational Formula 4]}$$

In Relational Formula 4, X represents sweep frequency (Hz), $Y_3$ represents the storage modulus (Pa) of the pressure-sensitive adhesive composition after curing as measured at a temperature of 60° C. and a strain of 1%, $\alpha_3$ is 630 to 1,200, preferably 640 to 1,100, and $\beta_3$ is $3.5\times10^4$ to $7.5\times10^4$, preferably $3.7\times10^4$ to $6.5\times10^4$.

When the pressure-sensitive adhesive composition for a foldable display according to the present invention does not satisfy the above-described Relational Formulas 1 and 4, it may be difficult to satisfy folding property, adhesion, heat resistance, and recovery rate requirements at the same time.

In addition, the pressure-sensitive adhesive composition for a foldable display according to the present invention may further satisfy conditions (9) to (12).

$$2.8\times10^4 \text{ Pa} \leq I \leq 5.5\times10^4 \text{ Pa, preferably } 2.85\times10^4 \text{ Pa} \leq I \leq 5.0\times10^4 \text{ Pa} \quad (9)$$

In the condition (9), I is the storage modulus of the pressure-sensitive adhesive composition after curing as measured at a temperature of 60° C., a frequency of 0.5 Hz, and a strain of 1%.

In regard to the condition (9), when I is less than $2.8\times10^4$ Pa, a heat resistance degradation issue may occur, and when I is greater than $5.5\times10^4$ Pa, a property change issue may occur.

$$3.2\times10^4 \text{ Pa} \leq J \leq 6.5\times10^4 \text{ Pa, preferably } 3.3\times10^4 \text{ Pa} \leq J \leq 6.0\times10^4 \text{ Pa} \quad (10)$$

In the condition (10), J is the storage modulus of the pressure-sensitive adhesive composition after curing as measured at a temperature of 60° C., a frequency of 1.0 Hz, and a strain of 1%.

In regard to the condition (10), when J is less than $3.2\times10^4$ Pa, a heat resistance degradation issue may occur, and when J is greater than $6.5\times10^4$ Pa, a property change issue may occur.

$$5.5\times10^4 \text{ Pa} \leq K \leq 10.5\times10^4 \text{ Pa, preferably } 5.7\times10^4 \text{ Pa} \leq K \leq 10\times10^4 \text{ Pa} \quad (11)$$

In the condition (11), K is the storage modulus of the pressure-sensitive adhesive composition after curing as measured at a temperature of 60° C., a frequency of 10 Hz, and a strain of 1%.

In regard to the condition (11), when K is less than $5.5\times10^4$ Pa, a heat resistance degradation issue may occur, and when K is greater than $10.5\times10^4$ Pa, a property change issue may occur.

$$10\times10^4 \text{ Pa} \leq L \leq 20\times10^4 \text{ Pa, preferably } 10.5\times10^4 \text{ Pa} \leq L \leq 17\times10^4 \text{ Pa} \quad (12)$$

In the condition (12), L is the storage modulus of the pressure-sensitive adhesive composition after curing as measured at a temperature of 60° C., a frequency of 100 Hz, and a strain of 1%.

In regard to the condition (12), when L is less than $10\times10^4$ Pa, a heat resistance degradation issue may occur, and when L is greater than $20\times10^4$ Pa, a property change issue may occur.

Meanwhile, the pressure-sensitive adhesive composition for a foldable display according to the present invention may have a glass transition temperature (Tg) of −32 to −27° C., preferably −31.5 to −27.5° C. When the glass transition temperature is less than −32° C., adhesion and heat resistance may be degraded, and when the glass transition temperature is greater than −27° C., not only adhesion is lowered, but also cracking or lifting may occur in the pressure-sensitive adhesive composition after curing, and folding properties may be degraded.

In addition, the pressure-sensitive adhesive composition for a foldable display according to the present invention may have an acid value of 8 to 19 mgKOH/g, preferably 9 to 18 mgKOH/g. When the acid value is less than 8 mgKOH/g, issues related to heat resistance may occur, and when the acid value is greater than 19 mgKOH/g, cracking or lifting may occur in the pressure-sensitive adhesive composition after curing, and not only folding properties may be lowered, but also strain may be increased at high temperatures.

In addition, the pressure-sensitive adhesive composition of the present invention may exhibit an adhesion of 700 to 1200 gf/inch, preferably 750 to 1100 gf/inch, when peeled at a rate of 300 mm/min and 180° after being attached to a non-alkali glass plate.

Meanwhile, the pressure-sensitive adhesive composition of the present invention may further satisfy the conditions (13) to (15).

$$75\% \leq M, \text{ preferably } 76\% \leq M \leq 85\% \quad (13)$$

In the condition (13), M is a recovery rate at 600 s after deformation of the cured pressure-sensitive adhesive composition as determined by Relational Formula 5 at a temperature of −20° C.

$$85\% \leq N, \text{ preferably } 87\% \leq N \leq 95\% \quad (14)$$

In the condition (14), N is a recovery rate at 600 s after deformation of the cured pressure-sensitive adhesive composition as determined by Relational Formula 5 at a temperature of 25° C.

$$90\% \leq O, \text{ preferably } 91\% \leq O \leq 99.9\% \quad (15)$$

In the condition (15), O is a recovery rate at 600 s after deformation of the cured pressure-sensitive adhesive composition as determined by Relational Formula 5 at a temperature of 60° C.

Recovery rate at 600 s after deformation (%)=(Strain after 600 s of deformation−Residual strain at 600 s after deformation)/Strain after 600 s of deformation×100 [Relational Formula 5]

Since the pressure-sensitive adhesive composition of the present invention satisfies all of the conditions (13) to (15), an excellent recovery rate is exhibited at various temperatures and even with prolonged use. Therefore, not only in summer but also in winter and for a long time, the pressure-sensitive adhesive of the present invention has an excellent recovery rate.

While the present invention has been described by way of exemplary embodiments, the embodiments are merely illustrative of the present invention, and those of ordinary skill in the art will appreciate that various modifications and applications not illustrated above are possible without departing from the essential characteristics of the present invention. For example, each of the components specifically described in the embodiments of the present invention may be implemented in various modified forms. In addition, differences related to such modifications and applications should be construed as being encompassed in the scope of the present invention as defined in the appended claims.

Example 1: Preparation of Pressure-Sensitive Adhesive Composition for Foldable Display As an acrylic polymer, a compound represented by Chemical Formula 1-1 and having an acid value of 12 mgKOH/g and a hydroxyl value of 0 mgKOH/g was provided.

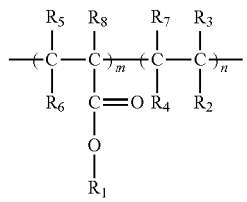

[Chemical Formula 1-1]

In Chemical Formula 1-1, $R_1$ is an octyl group, $R_2$ is a 2-carboxylethyl ester group, $R_3$, $R_4$, $R_5$, $R_6$, $R_7$, and $R_8$ are —H, m is 92, and n is 8.

(2) To 100 parts by weight of the provided acrylic polymer, 1 part by weight of N,N,N',N'-tetraglycidyl-m-xylenediamine diluted in methyl ethyl ketone (MEK) to a concentration of 6 wt % was added as a crosslinking agent, and thereby a pressure-sensitive adhesive composition was prepared.

Example 2: Preparation of Pressure-Sensitive Adhesive Composition for Foldable Display A pressure-sensitive adhesive composition was prepared in the same manner as in Example 1 except that, as an acrylic polymer, a compound represented by Chemical Formula 1-2 and having an acid value of 9 mgKOH/g and a hydroxyl value of 0 mgKOH/g was used instead of the compound represented by Chemical Formula 1-1.

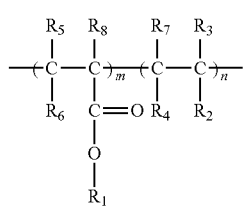

[Chemical Formula 1-2]

In Chemical Formula 1-2, $R_1$ is an octyl group, $R_2$ is a 2-carboxylethyl ester group, $R_3$, $R_4$, $R_5$, $R_6$, $R_7$, and $R_8$ are —H, m is 94, n is 6.

Example 3: Preparation of Pressure-Sensitive Adhesive Composition for Foldable Display A pressure-sensitive adhesive composition was prepared in the same manner as in Example 1 except that, as an acrylic polymer, a compound represented by Chemical Formula 1-3 and having an acid value of 15 mgKOH/g and a hydroxyl value of 0 mgKOH/g was used instead of the compound represented by Chemical Formula 1-1.

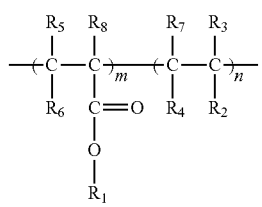

[Chemical Formula 1-3]

In Chemical Formula 1-3, $R_1$ is an octyl group, $R_2$ is a 2-carboxylethyl ester group, $R_3$, $R_4$, $R_5$, $R_6$, $R_7$, and $R_8$ are —H, m is 90, n is 10.

Example 4: Preparation of Pressure-Sensitive Adhesive Composition for Foldable Display A pressure-sensitive adhesive composition was prepared in the same manner as in Example 1 except that, as an acrylic polymer, a compound represented by Chemical Formula 1-4 and having an acid value of 18 mgKOH/g and a hydroxyl value of 0 mgKOH/g was used instead of the compound represented by Chemical Formula 1-1.

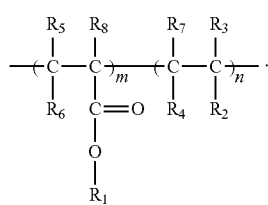

[Chemical Formula 1-4]

In Chemical Formula 1-4, $R_1$ is an octyl group, $R_2$ is a 2-carboxylethyl ester group, $R_3$, $R_4$, $R_5$, $R_6$, $R_7$, and $R_8$ are —H, m is 88, and n is 12.

Example 5: Preparation of Pressure-Sensitive Adhesive Composition for Foldable Display A pressure-sensitive adhesive composition was prepared in the same manner as in Example 1 except that, as an acrylic polymer, a compound represented by Chemical Formula 1-5 and having an acid value of 12 mgKOH/g and a hydroxyl value of 0 mgKOH/g was used instead of the compound represented by Chemical Formula 1-1.

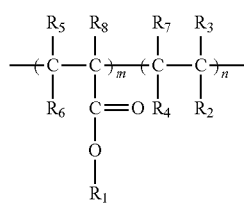

[Chemical Formula 1-5]

In Chemical Formula 1-5, $R_1$ is an octyl group, $R_2$ is a 2-carboxylethyl ester group, $R_3$, $R_4$, $R_5$, $R_6$, $R_7$, and $R_8$ are —H, m is 92, and n is 8.

Example 6: Preparation of Pressure-Sensitive Adhesive Composition for Foldable Display A pressure-sensitive adhesive composition was prepared in the same manner as in Example 1 except that, as an acrylic polymer, a compound represented by Chemical Formula 1-6 and having an acid value of 15 mgKOH/g and a hydroxyl value of 0 mgKOH/g was used instead of the compound represented by Chemical Formula 1-1.

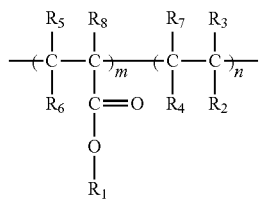

[Chemical Formula 1-6]

In Chemical Formula 1-6, $R_1$ is a butyl group, $R_2$ is a 2-carboxylethyl ester group, $R_3$, $R_4$, $R_5$, $R_6$, $R_7$, and $R_8$ are —H, m is 90, and n is 10.

Comparative Example 1: Preparation of Pressure-Sensitive Adhesive Composition for Foldable Display A pressure-sensitive adhesive composition was prepared in the same manner as in Example 1 except that, as an acrylic polymer, a compound represented by Chemical Formula 1-7 and having an acid value of 0 mgKOH/g and a hydroxyl value of 17 mgKOH/g was used instead of the compound represented by Chemical Formula 1-1.

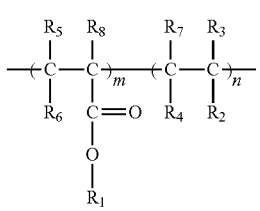

[Chemical Formula 1-7]

In Chemical Formula 1-7, $R_1$ is an octyl group, $R_2$ is a hydroxyethyl ester group, $R_3$, $R_4$, $R_5$, $R_6$, $R_7$, and $R_8$ are —H, m is 90, and n is 10.

Comparative Example 2: Preparation of Pressure-Sensitive Adhesive Composition for Foldable Display A pressure-sensitive adhesive composition was prepared in the same manner as in Example 1 except that, as an acrylic polymer, a compound represented by Chemical Formula 1-8 and having an acid value of 6 mgKOH/g and a hydroxyl value of 0 mgKOH/g was used instead of the compound represented by Chemical Formula 1-1.

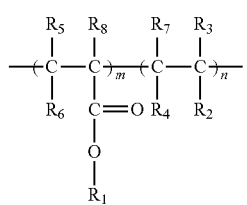

[Chemical Formula 1-8]

In Chemical Formula 1-8, $R_1$ is an octyl group, $R_2$ is a 2-carboxylethyl ester group, $R_3$, $R_4$, $R_5$, $R_6$, $R_7$, and $R_8$ are —H, m is 96, and n is 4.

Comparative Example 3: Preparation of Pressure-Sensitive Adhesive Composition for Foldable Display A pressure-sensitive adhesive composition was prepared in the same manner as in Example 1 except that, as an acrylic polymer, a compound represented by Chemical Formula 1-9 and having an acid value of 21 mgKOH/g and a hydroxyl value of 0 mgKOH/g was used instead of the compound represented by Chemical Formula 1-1.

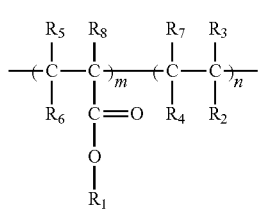

[Chemical Formula 1-9]

In Chemical Formula 1-9, $R_1$ is an octyl group, $R_2$ is a 2-carboxyethyl ester group, $R_3$, $R_4$, $R_5$, $R_6$, $R_7$, and $R_8$ are —H, m is 86, and n is 14.

Experimental Example 1

Properties of the pressure-sensitive adhesive compositions prepared in Examples 1 to 6 and Comparative Examples 1 to 3 were evaluated according to the following property evaluation methods, and the results are shown in Tables 1 to 4.

(1) Measurement of Storage Modulus

The pressure-sensitive adhesive compositions prepared in Examples 1 to 6 and Comparative Examples 1 to 3 were laminated, with a thickness of 0.8 mm, between release films such that bubbles were not generated, and were cured to prepare a test specimen. After placing the prepared test specimen on one side of a parallel plate and adjusting a gap, the torque was zeroed, and after confirming the stabilization of the force, the storage modulus for each temperature was measured.

* Measuring instrument and measuring conditions

① Measuring instrument: ARES-G2 manufactured by TA Instruments.

② Deformation (strain): 1%

③ Measurement temperature points: −20° C., 25° C., and 60° C.

④ Measurement frequency range: 0.01 Hz to 100 Hz (2) Measurement of Glass Transition Temperature (Tg)

In the storage modulus measurement of the pressure-sensitive adhesive compositions prepared in Examples 1 to 6 and Comparative Examples 1 to 3, the temperature of the region where tan delta was the highest was measured and determined as the glass transition temperature.

(3) Measurement of Heat Resistance

The heat resistance of the pressure-sensitive adhesive compositions prepared in Examples 1 to 6 and Comparative Examples 1 to 3 was evaluated during the storage modulus measurement, wherein the compositions having no change in appearance or properties were evaluated as "OK," and the compositions having a change in appearance, such as lifting, bubble generation, decomposition, melting, cracking, or the like, or a change in properties were evaluated as "Not good."

(4) Folding Test

Each of the pressure-sensitive adhesive compositions prepared in Examples 1 to 6 and Comparative Examples 1 to 3 was laminated, with a thickness of 25 μm, between 50 μm-thick polyimide films (GF200 manufactured by SKC Kolon PI.), and was cured to prepare a test specimen. The prepared test specimen was evaluated by repeatedly folding, to a radius of curvature of 2 mm, the test specimen 86,400 times a day up to a total of 200,000 times using a bending evaluation apparatus.

After the evaluation was completed, the pressure-sensitive adhesive compositions prepared in Examples 1 to 6 and Comparative Examples 1 to 3 were subjected to destructive and non-destructive tests, wherein the compositions having no change were evaluated as "OK," and the compositions having a deformation such as delamination, cracking, a thickness change, or the like were evaluated as "Not good."

(5) Measurement of Adhesion

Each of the pressure-sensitive adhesive compositions prepared in Examples 1 to 6 and Comparative Examples 1 to 3 were laminated, to a thickness of 25 μm, between 50 μm-thick polyimide films (GF200 manufactured by SKC Kolon PI.), and was cured to prepare a test specimen. The prepared test specimen was cut to a size of 25 mm×150 mm (width×length), and was attached to non-alkali glass using a 2 kg hand roller.

After the attachment, the test specimen was maintained at room temperature for 24 hours, and then was peeled at a rate of 300 mm/min and 180° to evaluate adhesion.

TABLE 1

| Classification | Tg (° C.) | Heat resistance | Folding test | Adhesion (gf/inch) | Storage modulus (Pa) −20° C. | | | |
|---|---|---|---|---|---|---|---|---|
| | | | | | 0.5 Hz | 1 Hz | 10 Hz | 100 Hz |
| Example 1 | −29.5 | OK | OK | 780 | $57 \times 10^4$ | $79.3 \times 10^4$ | $317.4 \times 10^4$ | $2433.3 \times 10^4$ |
| Example 2 | −30.3 | OK | OK | 730 | $50.8 \times 10^4$ | $70.7 \times 10^4$ | $282.6 \times 10^4$ | $2166.7 \times 10^4$ |
| Example 3 | −28.5 | OK | OK | 910 | $62.5 \times 10^4$ | $87 \times 10^4$ | $347.8 \times 10^4$ | $2666.7 \times 10^4$ |
| Example 4 | −27.7 | OK | OK | 1060 | $72.7 \times 10^4$ | $101.1 \times 10^4$ | $404.3 \times 10^4$ | $3100 \times 10^4$ |
| Example 5 | −29.4 | OK | OK | 750 | $58.6 \times 10^4$ | $81.5 \times 10^4$ | $326.1 \times 10^4$ | $2500 \times 10^4$ |
| Example 6 | −28.0 | OK | OK | 840 | $67.9 \times 10^4$ | $94.5 \times 10^4$ | $381.1 \times 10^4$ | $3117.9 \times 10^4$ |
| Comparative Example 1 | −35.3 | OK | Not good | 250 | $7.3 \times 10^4$ | $10.5 \times 10^4$ | $42.2 \times 104$ | $323.3 \times 10^4$ |
| Comparative Example 2 | −33.0 | Not good | Not good | 470 | $24 \times 10^4$ | $39 \times 10^4$ | $178.3 \times 10^4$ | $1366.7 \times 10^4$ |
| Comparative Example 3 | −26.3 | OK | Not good | 1450 | $117.2 \times 10^4$ | $163 \times 10^4$ | $652.2 \times 10^4$ | $5000 \times 10^4$ |

TABLE 2

| | Storage modulus (Pa) | | | | | | | |
|---|---|---|---|---|---|---|---|---|
| | 25° C. | | | | 60° C. | | | |
| Classification | 0.5 Hz | 1 Hz | 10 Hz | 100 Hz | 0.5 Hz | 1 Hz | 10 Hz | 100 Hz |
| Example 1 | $6.2 \times 10^4$ | $7.2 \times 10^4$ | $11.8 \times 10^4$ | $25.7 \times 10^4$ | $3.1 \times 10^4$ | $3.6 \times 10^4$ | $6.2 \times 10^4$ | $10.7 \times 10^4$ |
| Example 2 | $5.6 \times 10^4$ | $6.4 \times 10^4$ | $10.9 \times 10^4$ | $23.9 \times 10^4$ | $2.9 \times 10^4$ | $3.4 \times 10^4$ | $5.8 \times 10^4$ | $10.1 \times 10^4$ |
| Example 3 | $6.4 \times 10^4$ | $7.4 \times 10^4$ | $12.1 \times 10^4$ | $26.5 \times 10^4$ | $3.3 \times 10^4$ | $3.8 \times 10^4$ | $6.4 \times 10^4$ | $11.1 \times 10^4$ |
| Example 4 | $7.6 \times 10^4$ | $8.8 \times 10^4$ | $14.4 \times 10^4$ | $31.6 \times 10^4$ | $4.3 \times 10^4$ | $5.1 \times 10^4$ | $8.6 \times 10^4$ | $14.8 \times 10^4$ |
| Example 5 | $6.5 \times 10^4$ | $7.5 \times 10^4$ | $12.3 \times 10^4$ | $26.8 \times 10^4$ | $4.9 \times 10^4$ | $5.7 \times 10^4$ | $9.6 \times 10^4$ | $16.7 \times 10^4$ |
| Example 6 | $6.7 \times 10^4$ | $7.8 \times 10^4$ | $12.7 \times 10^4$ | $27.7 \times 10^4$ | $3.5 \times 10^4$ | $4.1 \times 10^4$ | $6.9 \times 10^4$ | $12.0 \times 10^4$ |
| Comparative Example 1 | $3.4 \times 10^4$ | $3.9 \times 10^4$ | $6.6 \times 10^4$ | $13.9 \times 10^4$ | $2.7 \times 10^4$ | $3.1 \times 10^4$ | $5.3 \times 10^4$ | $9.2 \times 10^4$ |
| Comparative Example 2 | $4.3 \times 10^4$ | $5.0 \times 10^4$ | $9.4 \times 10^4$ | $21.0 \times 10^4$ | $1.7 \times 10^4$ | $2.1 \times 10^4$ | $4.1 \times 10^4$ | $8.5 \times 10^4$ |
| Comparative Example 3 | $9.7 \times 10^4$ | $10.9 \times 10^4$ | $18.3 \times 10^4$ | $37.1 \times 10^4$ | $6.3 \times 10^4$ | $7.2 \times 10^4$ | $11.8 \times 10^4$ | $21.0 \times 10^4$ |

(6) Measurement of Reliability

Each of the pressure-sensitive adhesive compositions prepared in Examples 1 to 6 and Comparative Examples 1 to 3 were laminated, to a thickness of 25 μm, between 50 μm-thick polyimide films (GF200 manufactured by SKC Kolon PI.), and was cured to prepare a test specimen. Subsequently, the cured pressure-sensitive adhesive compositions prepared in Examples 1 to 6 and Comparative Examples 1 to 3 were evaluated, wherein the compositions having no lifting, degradation in adhesion, or change in property at each of the temperatures and humidities shown in Table 2 were evaluated as "OK," and the compositions that have undergone lifting, a degradation in adhesion, or a change in property were evaluated as "Not good."

TABLE 3

| | Reliability | | | | |
|---|---|---|---|---|---|
| Classification | -40° C. | 60° C. 90 RH % | 85° C. 85 RH % | 85° C. | Thermal shock (-40° C. ↔ 85° C.) |
| Example 1 | OK | OK | OK | OK | OK |
| Example 2 | OK | OK | OK | OK | OK |
| Example 3 | OK | OK | OK | OK | OK |
| Example 4 | OK | OK | OK | OK | OK |
| Example 5 | OK | OK | OK | OK | OK |
| Example 6 | OK | OK | OK | OK | OK |
| Comparative Example 1 | Not good | Not good | Not good | OK | Not good |
| Comparative Example 2 | Not good | Not good | Not good | OK | Not good |
| Comparative Example 3 | OK | OK | OK | OK | OK |

(7) Measurement of Strain, Residual Strain, and Recovery Rate

Each of the pressure-sensitive adhesive compositions prepared in Examples 1 to 6 and Comparative Examples 1 to 3 were laminated, to a thickness of 25 μm, between 50 μm-thick polyimide films (GF200 manufactured by SKC Kolon PI.), and was cured to prepare a test specimen. Each of the prepared test specimens was subjected to forced deformation by applying a constant force thereto. After 600 s of the deformation, the external force was removed, and the strain, residual strain, and recovery rate of the test specimens according to time and temperature were measured.

* Measuring instrument and measuring conditions
① Measuring instrument: ARES-G2 manufactured by TA Instruments.
② Pressure: 10,000 Pa
③ Deformation time: 600 seconds
④ Recovery time: 600 seconds
⑤ Recovery rate at 10 s after deformation (%)=(Strain after 600 s of deformation−Residual strain at 10 s after deformation)/Strain after 600 s of deformation×100
⑥ Recovery rate at 600 s after deformation (%)=(Strain after 600 s of deformation−Residual strain at 600 s after deformation)/Strain after 600 s of deformation×100

TABLE 4

| | Strain (%) | | | Residual strain (%) | | | | | |
|---|---|---|---|---|---|---|---|---|---|
| | -20° C. | 25° C. | 60° C. | -20° C. | | 25° C. | | 60° C. | |
| Classification | 600 s | 600 s | 600 s | 10 s | 600 s | 10 s | 600 s | 10 s | 600 s |
| Example 1 | 56.0 | 81.7 | 83.4 | 40.3 | 13.2 | 43.1 | 8.8 | 43.5 | 5.7 |
| Example 2 | 58.4 | 85.3 | 87.2 | 43.2 | 13.0 | 45.6 | 10.8 | 46.2 | 7.7 |
| Example 3 | 53.6 | 78.0 | 80.0 | 38.2 | 10.9 | 41.0 | 6.5 | 40.0 | 1.4 |
| Example 4 | 52.3 | 76.3 | 74.2 | 37.1 | 11.0 | 40.3 | 6.2 | 34.5 | 1.1 |
| Example 5 | 47.3 | 69.1 | 66.0 | 33.8 | 11.0 | 38.2 | 6.1 | 33.1 | 1.0 |
| Example 6 | 52.6 | 77.3 | 79.1 | 38.3 | 10.1 | 40.7 | 6.5 | 39.1 | 1.2 |

TABLE 4-continued

| Classification | | | | | | | | | |
|---|---|---|---|---|---|---|---|---|---|
| Comparative Example 1 | 54.6 | 79.7 | 85.2 | 40.1 | 9.4 | 31.4 | 8.1 | 29.9 | 0.7 |
| Comparative Example 2 | 122.2 | 178.4 | 273.3 | 97.2 | 42.7 | 90.1 | 21.4 | 174.4 | 43.7 |
| Comparative Example 3 | 26.8 | 39.2 | 24.3 | 17.1 | 4.6 | 9.9 | 1.5 | 15.3 | 0.7 |

| | Recovery rate (%) | | | | | |
|---|---|---|---|---|---|---|
| | −20° C. | | 25° C. | | 60° C. | |
| Classification | 10 s | 600 s | 10 s | 600 s | 10 s | 600 s |
| Example 1 | 28.0 | 76.4 | 47.2 | 89.2 | 47.8 | 93.2 |
| Example 2 | 26.0 | 77.7 | 46.5 | 87.3 | 47.0 | 91.2 |
| Example 3 | 28.7 | 79.7 | 47.4 | 91.7 | 50.0 | 98.3 |
| Example 4 | 29.1 | 79.0 | 47.2 | 91.9 | 53.5 | 98.5 |
| Example 5 | 28.5 | 76.7 | 44.7 | 91.2 | 49.8 | 98.5 |
| Example 6 | 27.2 | 80.8 | 47.3 | 91.6 | 50.6 | 98.5 |
| Comparative Example 1 | 26.6 | 82.8 | 60.6 | 89.9 | 64.9 | 99.2 |
| Comparative Example 2 | 20.5 | 65.1 | 49.5 | 88.0 | 36.2 | 84.0 |
| Comparative Example 3 | 36.2 | 82.8 | 74.7 | 96.2 | 55.4 | 98.0 |

As can be seen in Tables 1 to 4, the pressure-sensitive adhesive compositions prepared in Examples 1 to 6 not only allow excellent folding properties to be realized but also satisfies excellent adhesion, excellent heat resistance, and excellent recovery rate requirements at the same time.

Due to satisfying a specific range of storage modulus for each frequency at a temperature of 50° C. or more as well as at low temperature and room temperature, the pressure-sensitive adhesive composition for a foldable display according to the present invention can not only allow excellent folding properties to be realized but also can satisfy excellent adhesion, excellent heat resistance, and excellent recovery rate requirements at the same time.

It should be understood that the simple modifications or changes of the present invention can be easily carried out by those of ordinary skill in the art and that all such modifications or changes are encompassed included in the scope of the present invention.

What is claimed is:

1. A pressure-sensitive adhesive composition for a foldable display, the pressure-sensitive adhesive composition comprising an acrylic polymer and a crosslinking agent and satisfying the following Relational Formulas 1 and 2:

$$0 \leq X \leq 100 \quad \text{[Relational Formula 1]}$$

$$Y_1 = \alpha_1 \times X - \beta_1 \quad \text{[Relational Formula 2]}$$

wherein, in Relational Formulas 1 and 2, X represents sweep frequency (Hz), $Y_1$ represents a storage modulus (Pa) of the pressure-sensitive adhesive composition after curing as measured at a temperature of −20° C. and a strain of 1%, $\alpha_1$ is $15 \times 10^4$ to $45 \times 10^4$, and $\beta_1$ is $40 \times 10^4$ to $90 \times 10^4$.

2. The pressure-sensitive adhesive composition of claim 1, further satisfying the following Relational Formula 3:

$$Y_2 = \alpha_2 \times X - \beta_2 \quad \text{[Relational Formula 3]}$$

wherein, in Relational Formula 3, X represents sweep frequency (Hz), $Y_2$ represents the storage modulus (Pa) of the pressure-sensitive adhesive composition after curing as measured at a temperature of 25° C. and a strain of 1%, $\alpha_2$ is 1,600 to 2,400, and $\beta_2$ is $6 \times 10^4$ to $10 \times 10^4$.

3. The pressure-sensitive adhesive composition of claim 1, further satisfying the following Relational Formula 4:

$$Y_3 = \alpha_3 \times X - \beta_3 \quad \text{[Relational Formula 4]}$$

wherein, in Relational Formula 4, X represents sweep frequency (Hz), $Y_3$ represents the storage modulus (Pa) of the pressure-sensitive adhesive composition after curing as measured at a temperature of 60° C. and a strain of 1%, $\alpha_3$ is 630 to 1,200, and $\beta_3$ is $3.5 \times 10^4$ to $7.5 \times 10^4$.

4. The pressure-sensitive adhesive composition of claim 1, further satisfying the following conditions (1) to (4):

$$30 \times 10^4 \text{ Pa} \leq A \leq 100 \times 10^4 \text{ Pa} \quad (1)$$

$$50 \times 10^4 \text{ Pa} \leq B \leq 130 \times 10^4 \text{ Pa} \quad (2)$$

$$250 \times 10^4 \text{ Pa} \leq C \leq 450 \times 10^4 \text{ Pa} \quad (3)$$

$$2{,}000 \times 10^4 \text{ Pa} \leq D \leq 4{,}000 \times 10^4 \text{ Pa} \quad (4)$$

wherein, in the condition (1), A is a storage modulus of the pressure-sensitive adhesive composition after curing as measured at a temperature of −20° C., a frequency of 0.5 Hz, and a strain of 1%, in the condition (2), B is a storage modulus of the pressure-sensitive adhesive composition after curing as measured at a temperature of −20° C., a frequency of 1.0 Hz, and a strain of 1%, in the condition (3), C is a storage modulus of the pressure-sensitive adhesive composition after curing as measured at a temperature of −20° C., a frequency of 10 Hz, and a strain of 1%, and in the condition (4), D is a storage modulus of the pressure-sensitive adhesive composition after curing as measured at a temperature of −20° C., a frequency of 100 Hz, and a strain of 1%.

5. The pressure-sensitive adhesive composition of claim 2, further satisfying the following conditions (5) to (8):

$$5\times10^4\ Pa \leq E \leq 8\times10^4\ Pa \quad (5)$$

$$5.5\times10^4\ Pa \leq F \leq 9.5\times10^4\ Pa \quad (6)$$

$$10\times10^4\ Pa \leq G \leq 16\times10^4\ Pa \quad (7)$$

$$22\times10^4\ Pa \leq H \leq 35\times10^4\ Pa \quad (8)$$

wherein, in the condition (5), E is a storage modulus of the pressure-sensitive adhesive composition after curing as measured at a temperature of 25° C., a frequency of 0.5 Hz, and a strain of 1%, in the condition (6), F is a storage modulus of the pressure-sensitive adhesive composition after curing as measured at a temperature of 25° C., a frequency of 1.0 Hz, and a strain of 1%, in the condition (7), G is a storage modulus of the pressure-sensitive adhesive composition after curing as measured at a temperature of 25° C., a frequency of 10 Hz, and a strain of 1%, and in the condition (8), H is a storage modulus of the pressure-sensitive adhesive composition after curing as measured at a temperature of 25° C., a frequency of 100 Hz, and a strain of 1%.

6. The pressure-sensitive adhesive composition of claim 3, further satisfying the following conditions (9) to (12):

$$2.8\times10^4\ Pa \leq I \leq 5.5\times10^4\ Pa \quad (9)$$

$$3.2\times10^4\ Pa \leq J \leq 6.5\times10^4\ Pa \quad (10)$$

$$5.5\times10^4\ Pa \leq K \leq 10.5\times10^4\ Pa \quad (11)$$

$$10\times10^4\ Pa \leq L \leq 20\times10^4\ Pa \quad (12)$$

wherein, in the condition (9), I is a storage modulus of the pressure-sensitive adhesive composition after curing as measured at a temperature of 60° C., a frequency of 0.5 Hz, and a strain of 1%, in the condition (10), J is a storage modulus of the pressure-sensitive adhesive composition after curing as measured at a temperature of 60° C., a frequency of 1.0 Hz, and a strain of 1%, in the condition (11), K is a storage modulus of the pressure-sensitive adhesive composition after curing as measured at a temperature of 60° C., a frequency of 10 Hz, and a strain of 1%, and in the condition (12), L is a storage modulus of the pressure-sensitive adhesive composition after curing as measured at a temperature of 60° C., a frequency of 100 Hz, and a strain of 1%.

7. The pressure-sensitive adhesive composition of claim 1, wherein the acrylic polymer includes a compound represented by the following Chemical Formula 1:

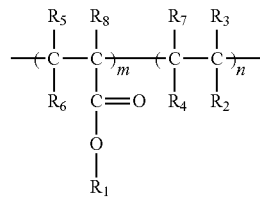

[Chemical Formula 1]

wherein, in Chemical Formula 1, $R_1$ is a C1-C20 alkyl group, $R_2$ is a carboxyl group, a carboxymethyl ester group, a 2-carboxyethyl ester group, a 3-carboxypropyl ester group, a 4-carboxybutyl ester group, a 5-carboxypentyl ester group, or a 6-carboxyhexyl ester group, $R_3$, $R_4$, $R_5$, $R_6$, $R_7$, and $R_8$ are each independently —H or a C1-C10 alkyl group, m is a rational number satisfying a range of 87 to 95, and n is a rational number satisfying a range of 5 to 13.

8. The pressure-sensitive adhesive composition of claim 1, wherein the crosslinking agent includes one or more selected from among ethylene glycol diglycidyl ether, triglycidyl ether, trimethylolpropane triglycidyl ether, N,N,N,N'-tetraglycidyl-m-xylenediamine, and glycerin diglycidyl ether.

9. The pressure-sensitive adhesive composition of claim 1, wherein the crosslinking agent is included in an amount of 0.1 part by weight to 10 parts by weight relative to 100 parts by weight of the acrylic polymer.

10. The pressure-sensitive adhesive composition of claim 1, further satisfying the following conditions (13) to (15):

$$75\% \leq M \quad (13)$$

$$85\% \leq N \quad (14)$$

$$90\% \leq O \quad (15)$$

wherein, in the condition (13), M is a recovery rate at 600 seconds after deformation of the cured pressure-sensitive adhesive composition as determined by Relational Formula 5 at a temperature of −20° C., in the condition (14), N is a recovery rate at 600 seconds after deformation of the cured pressure-sensitive adhesive composition as determined by Relational Formula 5 at a temperature of 25° C., and in the condition (15), O is a recovery rate at 600 seconds after deformation of the cured pressure-sensitive adhesive composition as determined by Relational Formula 5 at a temperature of 60° C.

Recovery rate at 600 seconds after deformation (%)= (Strain after 600 seconds of deformation−Residual strain at 600 seconds after deformation)/Strain after 600 seconds of deformation×100    [Relational Formula 5]

11. The pressure-sensitive adhesive composition of claim 1, which has a glass transition temperature (Tg) of −32° C. to −27° C.

12. The pressure-sensitive adhesive composition of claim 1, which has an acid value of 8 mgKOH/g to 19 mgKOH/g.

13. The pressure-sensitive adhesive composition of claim 1, which has an adhesion of 700 gf/inch to 1200 gf/inch when peeled at a rate of 300 mm/minute and 180° after being attached to a non-alkali glass plate.

* * * * *